(12) United States Patent
Davis et al.

(10) Patent No.: US 12,641,054 B2

(45) Date of Patent: *May 26, 2026

(54) DETECTION OF DOMAIN HIJACKING DURING DNS LOOKUP

(71) Applicant: HYAS Infosec Inc., Vancouver (CA)

(72) Inventors: Christopher Michael Davis, Nanaimo (CA); Steven Mark Heyns, Nanaimo (CA); Paul Cornelius van Gool, Santa Barbara, CA (US)

(73) Assignee: HYAS Infosec Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,401

(22) Filed: Mar. 25, 2024

(65) Prior Publication Data

US 2024/0236035 A1 Jul. 11, 2024

Related U.S. Application Data

(63) Continuation of application No. 17/108,585, filed on Dec. 1, 2020, now Pat. No. 11,943,196.

(51) Int. Cl.
| | |
|---|---|
| *H04L 61/4511* | (2022.01) |
| *H04L 9/40* | (2022.01) |
| *H04L 101/69* | (2022.01) |

(52) U.S. Cl.
CPC ........ *H04L 61/4511* (2022.05); *H04L 63/101* (2013.01); *H04L 63/126* (2013.01); *H04L 63/1483* (2013.01); *H04L 2101/69* (2022.05)

(58) Field of Classification Search
CPC . H04L 61/4511; H04L 9/3247; H04L 63/101;

H04L 63/20; H04L 9/50; H04L 61/5007; H04L 63/0884; H04L 63/1425; H04L 63/1441; H04L 63/0272; H04L 63/126; H04L 9/3236; H04L 63/0823; H04L 9/3263; H04L 63/0281; H04L 63/104; H04L 63/1416; H04L 63/107; H04L 67/02; H04L 67/52; H04L 9/321;

(Continued)

(56) References Cited

U.S. PATENT DOCUMENTS

| | | | | |
|---|---|---|---|---|
| 10,110,614 | B2 * | 10/2018 | Kaliski, Jr. ......... | H04L 61/4511 |
| 2006/0112176 | A1 * | 5/2006 | Liu ....................... | H04L 67/101 709/245 |

(Continued)

*Primary Examiner* — Djenane M Bayard

(74) *Attorney, Agent, or Firm* — Stinson LLP

(57) ABSTRACT

The technology disclosed herein enables detection of domain hijacking when a DNS resolver is performing a DNS lookup. In a particular embodiment, a method provides receiving a DNS request from a requesting computing system. The DNS request includes a domain name for which the requesting computing system is requesting resolution of a network address associated with the domain name in the DNS. The method further provides, in response to receiving the DNS request, identifying a nameserver, via a root nameserver of the DNS, to handle the DNS request and determining the nameserver is not a proper nameserver for the domain name specifically. The proper nameserver is defined by nameserver criteria generated specifically for the domain name. The method also provides preventing the nameserver from being used to resolve the DNS request in response to determining that the nameserver is not a proper nameserver for the domain name.

20 Claims, 7 Drawing Sheets

(58) Field of Classification Search
CPC .............. H04L 9/3239; H04L 2209/56; H04L 41/0895; H04L 41/0893; H04L 41/0894; H04L 43/08; H04L 47/193; H04L 47/20; H04L 51/48; H04L 61/103; H04L 61/5084; H04L 63/102; H04L 63/1491; H04L 69/321; H04L 63/0236; H04L 9/3268; H04L 12/4633; H04L 51/18; H04L 51/212; H04L 51/214; H04L 61/58; H04L 61/59; H04L 63/0245; H04L 63/1483; H04L 63/18; H04L 67/303; H04L 69/16; H04L 69/22; H04L 9/3234; H04L 63/0428; H04L 63/105; H04L 12/66; H04L 2101/69; H04L 63/08; H04L 63/10; H04L 67/12; H04L 9/0643; H04L 9/0891; H04L 2101/659; H04L 61/3015; H04L 61/3025; H04L 61/4552; H04L 63/123; H04L 9/006; H04L 9/0894; H04L 45/04; H04L 63/1458; H04L 63/1466; H04L 63/1408; H04L 67/1001; H04L 67/1036; H04L 67/1008; H04L 61/5076; H04L 9/40; H04L 63/145; H04L 61/4541; H04L 2463/142; H04L 61/5014; H04L 61/106; H04L 45/26; H04L 61/4557; H04L 65/1045; H04L 65/1069; H04L 65/1104; H04L 65/401; H04L 43/16; H04L 45/72; H04L 67/1021; H04L 67/566; H04L 67/101; H04L 69/329; H04L 67/63; H04L 43/0805; H04L 61/2514; H04L 43/0894
See application file for complete search history.

(56)          References Cited

U.S. PATENT DOCUMENTS

| | | | | |
|---|---|---|---|---|
| 2009/0157889 A1* | 6/2009 | Treuhaft | ............. | H04L 63/1441 |
| | | | | 709/230 |
| 2010/0175137 A1* | 7/2010 | Parsons | .................. | H04L 51/04 |
| | | | | 726/26 |
| 2016/0150004 A1* | 5/2016 | Hentunen | ........... | H04L 63/1433 |
| | | | | 726/23 |
| 2018/0234439 A1* | 8/2018 | Heuser | ................ | H04L 61/4511 |

* cited by examiner

200

RECEIVE REQUEST TO RESOLVE AN ADDRESS FOR A DOMAIN NAME    201

DETERMINE THAT NAMESERVER FOR THE DOMAIN NAME IS SUSPECT    202

PREVENTING THE NAMESERVER FROM RESOLVING THE REQUEST    203

NAME-SERVERS 403

NS 433

NS 434

NS 432

NS 432

NS 431

NS 431

DNS RESOLVER 401

1. ID NAMESERVERS 431-433 FOR DOMAIN NAME 411

2. CONFIRM NAMESERVERS 431-433 ARE PROPER

3. GEN. HASH 421 OF NAMESERVERS 431-433

4. ID NAMESERVERS 431-432, 434 FOR DOMAIN 411

5. GEN. HASH 422 OF NAMESERVERS 431-432, 434

6. DET. HASH 421 DOES NOT MATCH HASH 422

7. DETERMINE IF ANY ARE SUSPECT

400

DETECTION OF DOMAIN HIJACKING DURING DNS LOOKUP

RELATED APPLICATIONS

This application is a continuation of, and claims priority to, U.S. patent application Ser. No. 17/108,585, entitled "DETECTION OF DOMAIN HIJACKING DURING DNS LOOKUP," filed Dec. 1, 2020, which is hereby incorporated by reference in its entirety for all purposes.

TECHNICAL BACKGROUND

The Domain Name System (DNS) allows a computing system to contact another computing system over the internet using a domain name rather than using the other system's network address. DNS nameservers receive requests for network addresses associated with domain names and identify network addresses that correspond to the respective domain names. A computing system requesting a domain name resolution uses a network address supplied by a nameserver to contact another computing system (e.g., web server) associated with the domain name and having the supplied network address. Occasionally, a domain name may be hijacked by directing DNS requests for the domain name to an improper nameserver (e.g., a nameserver not defined by the owner of a website having the domain name). That improper nameserver may return an incorrect network address that will cause the computing system requesting the domain name resolution to contact a computing system not actually associated with the domain name. Various malicious activity may then be carried out on that improper connection (e.g., information stealing).

SUMMARY

The technology disclosed herein enables detection of domain hijacking when a DNS resolver is performing a DNS lookup. In a particular embodiment, a method provides receiving a DNS request from a requesting computing system. The DNS request includes a domain name for which the requesting computing system is requesting resolution of a network address associated with the domain name in the DNS. The method further provides, in response to receiving the DNS request, identifying a nameserver, via a root nameserver of the DNS, to handle the DNS request and determining the nameserver is not a proper nameserver for the domain name specifically. The proper nameserver is defined by nameserver criteria generated specifically for the domain name. The method also provides preventing the nameserver from being used to resolve the DNS request in response to determining that the nameserver is not a proper nameserver for the domain name.

In another example, an apparatus is provided having one or more computer readable storage media and a processing system operatively coupled with the one or more computer readable storage media. Program instructions stored on the one or more computer readable storage media, when read and executed by the processing system, direct the processing system to perform the above-recited method.

DETAILED DESCRIPTION

The DNS resolvers herein mitigate adverse effects caused by domain hijacking. When a domain name is hijacked a computing system requesting a network address (e.g., an Internet Protocol (IP) address) associated with the domain name may not receive such a network address. Rather, a nameserver that has hijacked the domain name provides a network address to a computing system associated with the hijacking nameserver. That computing system may be malicious and, when contacted by the requesting computing system, may infect the requesting computing system with malware, may attempt a phishing attack on a user of the requesting system, or may perform some other undesired function. For example, the malicious computing system may spoof a website associated with the domain name. Then, when a user of the requesting computing system enters information (e.g., credit card information, personal information, etc.) into the spoofed website, the malicious computing system receives that information instead of the computing systems for the real website.

If the requesting computing system is never provided with a network address from a nameserver that has hijacked a domain name, then the requesting computing system will not be compromised by communicating with a malicious computing server at that network address. As detailed below, the DNS resolvers herein characterize properly associated nameservers (i.e., the nameservers that a domain name owner intends to be associated with the domain name) so that DNS requests do not get resolved using a nameserver that the DNS resolvers suspect of domain hijacking. When the DNS request does not get resolved for the requesting computing system, the requesting computing system cannot contact a network address associated with a domain name in the DNS request. The requesting computing system is, therefore, prevented from accessing a potentially malicious computing system due to domain hijacking.

Figure 1:
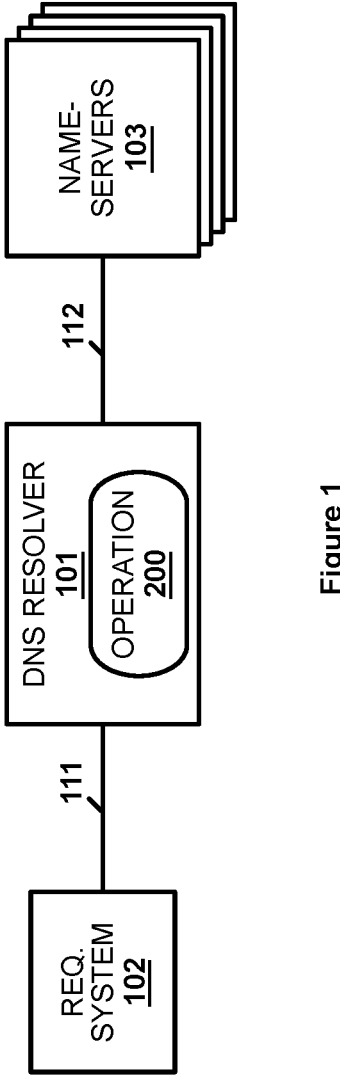
FIG. 1 illustrates an implementation for detecting domain hijacking during DNS lookup.

FIG. 1 illustrates implementation 100 for detecting domain hijacking during DNS lookup. Implementation 100 includes DNS resolver 101, requesting computing system 102, and nameservers 103. DNS resolver 101 and requesting computing system 102 communicate over communication link 111. DNS resolver 101 and nameservers 103 communicate over communication links 112. Communication links 111-112 are shown as direct links but may include intervening systems, networks, and/or devices.

In operation, DNS resolver 101 is a computing system that resolves network addresses associated with domain names on behalf of requesting systems, such as requesting computing system 102. Nameservers 103 are nameservers of the global DNS and include records, commonly referred to as A records, of network addresses associated with respective domain names. For redundancy, at least two of nameservers 103 are typically used to keep network address records for any given domain name. A conventional DNS resolver simply identifies and retrieves a network address from one of the nameservers associated with a domain name in a DNS request to resolve the DNS request. In contrast, if DNS resolver 101 determines that an identified nameserver is suspect (e.g., may be malicious or otherwise not actually intended to be used for the domain name by the domain name's owner), then DNS resolver 101 does not resolve the DNS request using the suspect nameserver. By not resolving the DNS request, DNS resolver 101 prevents the computing system that sent the request from unknowingly being directed to a computing system not actually associated with the domain name (e.g., a malicious web server).

Figure 2:
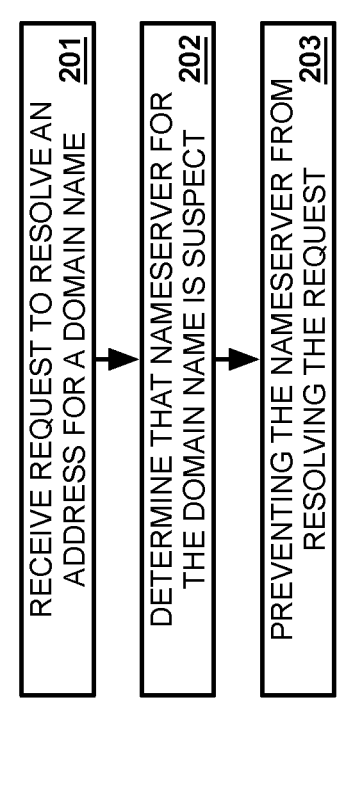
FIG. 2 illustrates an operation to detect domain hijacking during DNS lookup.

FIG. 2 illustrates operation 200 to detect domain hijacking during DNS lookup. During operation 200, DNS resolver 101 receives a DNS request from requesting computing system 102 (201). The DNS request includes a domain name for which requesting computing system 102 is requesting a corresponding network address. Requesting computing system 102 may be a user system (e.g., telephone, laptop, personal computer, tablet computer, or some other type of user operable computing system) but may also be any other type of computing system capable of using DNS requests to request network addresses associated with domain names. Requesting computing system 102 may address the DNS request directly to DNS resolver 101 or, if the DNS request is directed to a different DNS resolver (e.g., a DNS resolver in an internet service provider of requesting computing system 102), then an intermediate system (e.g., network firewall) may redirect the DNS request to DNS resolver 101. The DNS request may be transferred to DNS resolver 101 in response to a user of requesting computing system 102 directing a web browser application executing on requesting computing system 102 to a particular website using a domain name for that website (e.g., the user may enter a Uniform Resource Locator (URL) with the domain name into the web browser). Although, other reasons that requesting computing system 102 may submit a DNS request also exist (e.g., a database system may be identified to an application on requesting computing system 102 using a URL with a domain name).

Upon receiving the DNS request from requesting computing system 102, DNS resolver 101 determines that a nameserver for the domain name is suspect based on satisfaction of nameserver criteria associated with the domain name (202). The nameserver criteria defines whether characteristics of a particular nameserver indicate that the nameserver is suspect or is likely a proper nameserver for the domain name. The nameserver criteria may be based on characteristics such as a name/identifier of a nameserver (e.g., ns1.hostingservice.com), a hosting service associated with the nameserver (which is many times indicated in the nameserver's name), a geographic location of the nameserver, an amount of time that the nameserver has been associated with the domain name, or any other type of information that DNS resolver 101 may be able to determine about the nameserver—including combinations thereof. The nameserver criteria may indicate characteristics that are allowed (i.e., are not suspect) and/or characteristics that are not allowed (i.e., are suspect). For example, the nameserver criteria may list hosting services known to be associated with the domain name. If the nameserver identified by DNS resolver 101 is a nameserver for a hosting service not in that list of nameservers, then DNS resolver 101 determines that the nameserver is suspect. In another example, the nameserver criteria may list geographic locations (e.g., countries) that are not allowed. If the nameserver identified by DNS resolver 101 is in one of those locations, then DNS resolver 101 determines that the nameserver is suspect. In some cases, the nameserver criteria may indicate combinations of characteristics that are or are not allowed. For example, the nameserver criteria may indicate that all nameservers in a particular geographic location are suspect except for nameservers associated with a particular hosting service (e.g., nameservers operated by the hosting service). The nameserver criteria associated with the domain in this example may be different from the nameserver criteria associated with another domain name because characteristics that may indicate a nameserver for one domain name is suspect may not be the same for another domain name. For instance, a nameserver associated with a hosting service may not be suspect for a first domain name since a website for the first domain name uses the hosting service. However, that same nameserver may be suspect for a second domain name since a website for the second domain name uses a different hosting service. In other examples, the nameserver criteria may defines such that it is applicable (and thereby associated with) multiple, or even all, domain names that DNS resolver 501 is configured to resolve.

After DNS resolver 101 determines that the nameserver is suspect, DNS resolver 101 prevents the suspect nameserver from being used to resolve the request in response to determining that the nameserver is suspect (203). To prevent the suspect nameserver from being used to resolve the request, DNS resolver 101 may simply not contact the nameserver to request the network address associated with the domain name. Since DNS resolver 101 did not contact the nameserver, DNS resolver 101 will not have a network address for transfer to requesting computing system 102 to resolve the DNS request from requesting computing system 102. In that case, DNS resolver 101 may send a message to requesting computing system 102 indicating that the DNS request could not be resolved or may simply allow the DNS request to timeout at requesting computing system 102. In some examples, DNS resolver 101 may attempt to identify one or more other nameservers associated with the domain name. If one of those other nameservers is not determined to be suspect, then DNS resolver 101 may request the network address from the other nameserver and resolve the DNS request to requesting computing system 102 using the network address from the other nameserver. Alternatively, DNS resolver 101 may assume all nameservers associated with the domain name are suspect in response to one nameserver being suspect and not attempt to request the network address from any of the nameservers.

Advantageously, requesting computing system 102 never receives a network address that was provided by a nameserver that DNS resolver 101 determined to be suspect. Requesting computing system 102, consequently, is never able to contact the computing system having a network address that would have been provided by the suspect nameserver. Any potentially adverse effects from contacting that computing system are thereby avoided.

Figure 3:
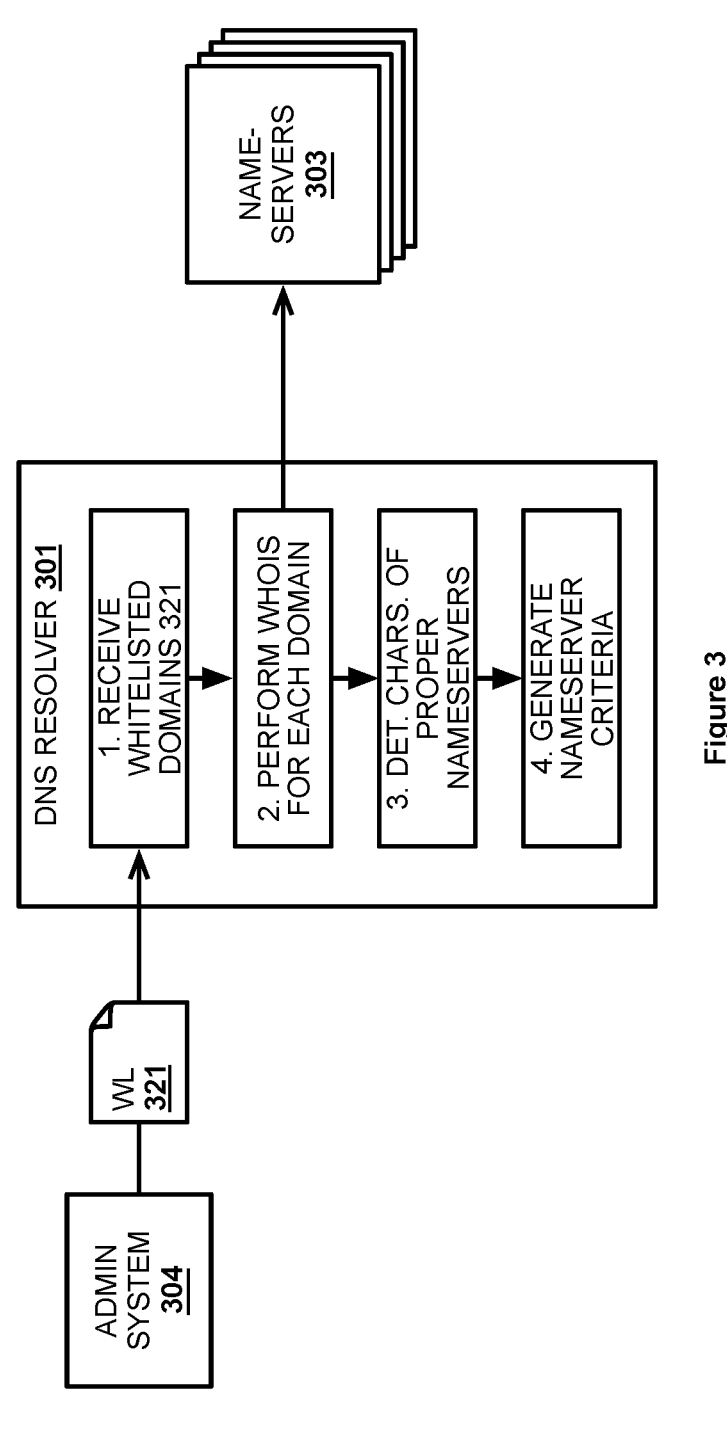
FIG. 3 illustrates an operational scenario for detecting domain hijacking during DNS lookup.

FIG. 3 illustrates operational scenario 300 for detecting domain hijacking during DNS lookup. Operational scenario 300 is an example of how the nameserver criteria discussed above is generated. DNS resolver 301 is an example of DNS resolver 101 and nameservers 303 are examples of nameservers 103. Administrator system 304 is a user system (e.g., laptop, desktop workstation, telephone, etc.) that, in this example, is operated by an administrative user for DNS resolver 301. While DNS resolver 301 performs the steps to generate the nameserver criteria in this example, another system(s) may perform the steps in other examples and then provide the nameserver criteria for use by DNS resolver 301 to perform operation 200.

In operational scenario 300, DNS resolver 301 receives domain name whitelist 321 at step 1 from administrator system 304. The administrative user operating administrator system 304 may be an employee of an enterprise that is tasked with protecting computing systems in the enterprise. Domain name whitelist 321 is a list of domain names that the administrator believes computing systems using DNS resolver 301 (e.g., computing systems within the enterprise) to resolve DNS requests should be allowed to contact. For example, domain name whitelist 321 may list websites that are appropriate for visitation by users. Websites not on domain name whitelist 321 may simply be blocked by a firewall, or otherwise not allowed to be accessed by computing systems under the control of the administrative user. As such, the number of domain names for which DNS resolver 301 needs to generate nameserver criteria is limited by domain name whitelist 321.

For each domain in domain name whitelist 321, DNS resolver 301 performs a WHOIS lookup at step 2. A WHOIS lookup for nameservers will return names of the nameservers that are currently assigned to provide a network address for the domain name that is the subject of the WHOIS lookup. After identifying the names of the nameservers for a domain name, DNS resolver 301 then determines characteristics of proper nameservers for the domain name at step 3. A proper nameserver is a nameserver that is actually supposed to be providing network addresses corresponding to the domain name (e.g., a nameserver that the domain name's owner registered). When first generating nameserver criteria, DNS resolver 301 may simply assume that all nameservers returned by the WHOIS lookup for a particular domain name are proper. Alternatively, DNS resolver 301 may use initial criteria and/or query a user, such as the administrator operating administrator system 304, to determine whether the nameservers are proper. In the initial criteria examples, the initial criteria may be preinstalled into DNS resolver 301, may be provided by a user, or may be obtained from some other source. The initial criteria may include generally applicable characteristics that indicate a nameserver is or is not suspect (e.g., may include nameserver names that are well known and recognized as being proper, or as being suspect, across a wide range of domain names). The nameserver characteristics for a domain name are then determined for the proper nameservers for the domain name. The characteristics may be implicit or explicit in the nameserver name itself (e.g., the name may indicate a hosting service) or DNS resolver 301 may query other systems, including the nameserver itself, to determine characteristics of a nameserver. For example, DNS resolver 301 may determine an IP address of a nameserver to determine a geographic location of the nameserver based on the IP address.

DNS resolver 301 generates nameserver criteria for each domain name at step 4 from the characteristics of the proper nameservers. The nameserver criteria may build upon the initial criteria or may be independent of the initial criteria. This first iteration of nameserver criteria may be based on a single WHOIS lookup for each domain name or DNS resolver 301 may continue to perform WHOIS lookups over time to capture characteristics of other nameservers for a domain name since nameservers may change over time (e.g., a domain name owner may choose to switch hosting services and, thereby, switch nameservers accordingly). In some examples, characteristics of nameservers not identified for a particular domain name (e.g., those identified for other domain names) may be used when generating the nameserver criteria for the domain name. For example, if a particular nameserver is know to universally be malicious, then characteristics of that nameserver may be included in the nameserver criteria as a suspect nameserver.

In some examples, steps 2-4 may repeat periodically to update the nameserver criteria for each domain name in domain name whitelist 321. That is, at step 4, rather than generating completely new criteria, DNS resolver 301 may update the nameserver criteria that already exists for the domain name. In further examples, a machine learning algorithm may be employed as the nameserver criteria. The machine learning algorithm may be a neural network that automatically learns to create its own nameserver criteria for a domain name. In those examples, the differentiation of nameserver criteria between domain names may be blurred because the algorithm may treat the domain name itself as one of the input factors. For example, the algorithm may be fed training input indicating various domains, such as those in domain name whitelist 321, along with nameserver characteristics indicating whether each set of characteristics are for a suspect or proper nameserver for the respective domains. As more and more input sets are provided to the algorithm, the algorithm automatically learns more and more about which nameservers are proper or suspect for any given domain name. In some cases, the algorithm may be trained using domain names that are not included in domain name whitelist 321 to further add to its robustness. Once the algorithm has been trained on a sufficient number of domain names and nameserver combinations, DNS resolver 301 can provide the algorithm with a domain name and nameserver characteristics of a nameserver and the algorithm will output whether the nameserver is suspect.

Figure 4:
FIG. 4 illustrates another operational scenario for detecting domain hijacking during DNS lookup.

FIG. 4 illustrates operational scenario 400 for detecting domain hijacking during DNS lookup. In operational scenario 400, DNS resolver 401 is an example of DNS resolver 101 and nameservers 403 are examples of nameservers 103. Operational scenario 400 is an example of how DNS resolver 401 determines when nameserver criteria should be updated for a given domain name. In operational scenario 400, DNS resolver 401 identifies nameservers 431-433 from nameservers 403 at step 1 as being the current nameservers for domain name 411. For example, DNS resolver 401 may perform a WHOIS lookup to identify nameservers 431-433 as part of step 2 from operational scenario 300 or may perform the lookup at some other time. DNS resolver 401 then determines whether nameservers 431-433 are proper nameservers for domain name 411 at step 2 based on nameserver criteria (or the initial criteria discussed above if nameserver criteria has yet to be generated) for domain name 411. Once nameservers 431-433 are determined to be proper, DNS resolver 401 generates nameserver hash 421 at step 3 from nameservers 431-433. Nameserver hash 421 is a unique hash (i.e., number or character string) that is the output of a hash function that would be different. The hash function may receive nameserver names, network addresses, and/or some other unique identifier for nameservers 431-433 as input. DNS resolver 401 uses nameserver hash 421 in place of maintaining a record of nameservers 431-433 being associated with the domain name to determine when one or more of the nameservers for the domain name has changed. While the resources needed to maintain/process a record of nameservers associated with a single domain name are minimal, the resources needed to maintain/process records of nameservers for many domain names are not negligible. Instead, DNS resolver 401 stores a simple hash, like nameserver hash 421, associated with each domain name. If the hash changes from one time to the next, at least one of the nameservers used to generate the hash has also changed.

In this example, at a later time, DNS resolver 401 identifies nameservers 431-432, 434 from nameservers 403 at step 4 as being the current nameservers for domain name 411. Step 4 may be performed in response to a DNS request for domain name 411 or may be performed at some other time (e.g., during a periodic update of nameserver information for domain name 411). Nameserver hash 422 is then generated at step 5 for nameservers 431-432, 434 in the same way nameserver hash 421 was generated for nameservers 431-433. Since nameserver 434 replaced nameserver 433 as a nameserver for domain name 411, nameserver hash 421 does not match nameserver hash 422, as DNS resolver 401 determines at step 6. Accordingly, DNS resolver 401 determines whether any of nameservers 431-432, 434 are suspect at step 7 based on nameserver criteria for domain name 411. If all of nameservers 431-432, 434 are not suspect then nameserver hash 422 replaces nameserver hash 421 as the hash to which subsequently generated hashes of nameservers are compared. In some cases, since at least one of nameservers 431-432, 434 are new (i.e., nameserver 434 in this case), DNS resolver 401 may also update the nameserver criteria for domain name 411 using characteristics of nameserver 434. If nameserver 434 is determined to be a suspect nameserver in this example, then DNS resolver 401 may still use nameserver hash 422 for future comparisons. Although, in this case, DNS resolver 401 will be looking for a change in nameservers so that it can determine whether all suspect nameservers have been removed. DNS resolver 401 may also update the nameserver criteria for domain name 411 based on nameserver 434 being a suspect nameserver.

It should be understood that, while the examples above include DNS resolvers (i.e., 101, 301, and 401) performing the various operation steps, other systems may perform at least some of the steps instead. For instance, a nameserver validation system in communication with a DNS resolver may be queried by the DNS resolver to determine whether a nameserver identified by the DNS resolver is suspect. That nameserver validation system may also perform the steps necessary to generate nameserver criteria that is used to determine whether the nameserver indicated in the query is suspect. In another example, an intermediate system, such as a firewall, may be located on the data path for DNS requests. The intermediate system may determine a nameserver from which a DNS response to a DNS request is received and query the nameserver validation system about whether the nameserver is suspect. If the nameserver validation system indicates to the intermediate system that the nameserver is suspect, then the intermediate system may block the DNS response from reaching the requesting system.

Figure 5:
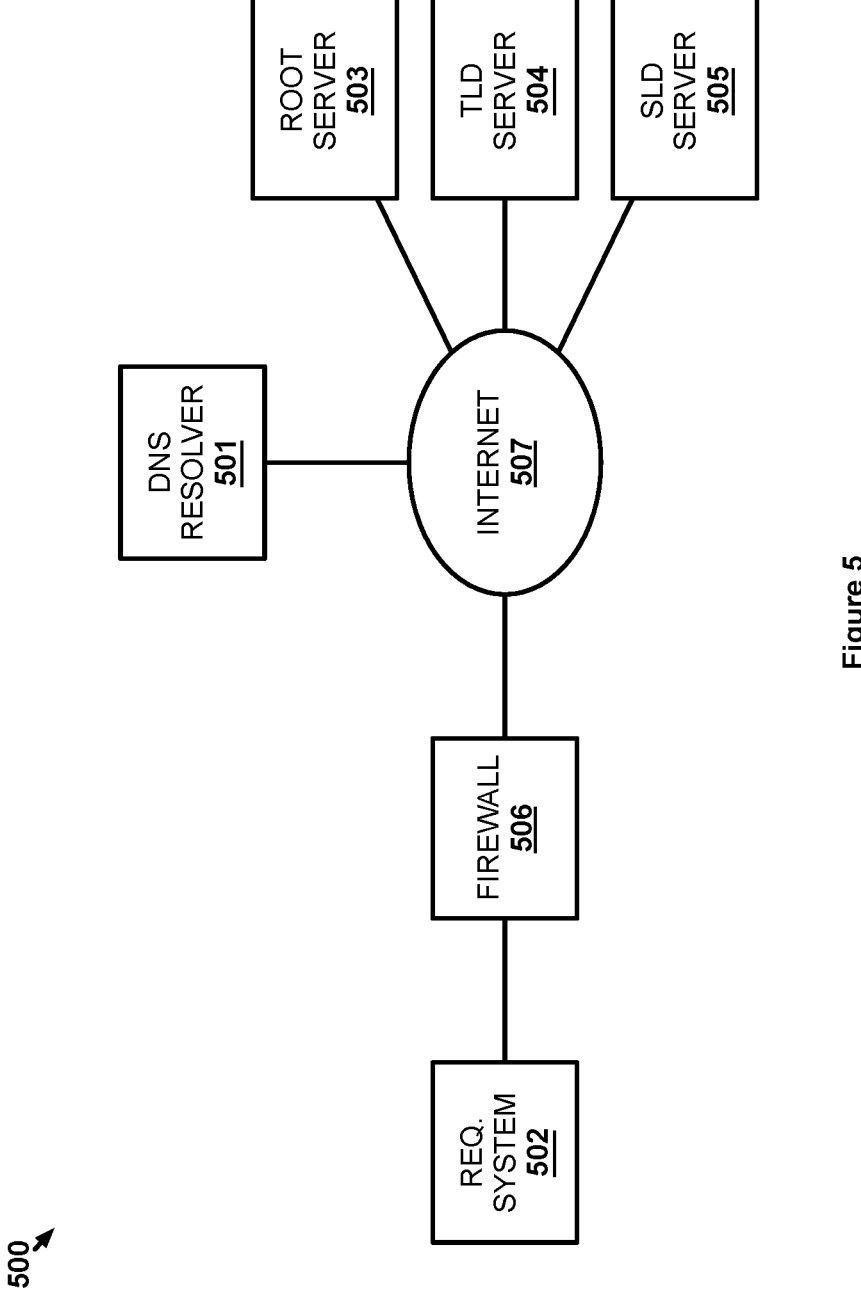
FIG. 5 illustrates another implementation for detecting domain hijacking during DNS lookup.

FIG. 5 illustrates implementation 500 for detecting domain hijacking during DNS lookup. Implementation 500 includes DNS resolver 501, requesting computing system 502, root server 503, Top Level Domain (TLD) server 504, Second Level Domain (SLD) nameserver 505, firewall 506, and Internet 507. In this example, requesting computing system 502 is a user system operating by a user and is located behind firewall 506 from Internet 507. Firewall 506 regulates network traffic exchanged with requesting computing system 502. While shown separately, requesting computing system 502 may incorporate firewall 506 (e.g., via software, a hardware module on a networking card, or otherwise). Though not shown, requesting computing system 502 may be on a local area network (LAN) and firewall 506 may regulate network traffic for computing systems on the LAN in addition to requesting computing system 502.

Root nameserver 503, TLD nameserver 504, and SLD nameserver 505 are each different types of nameservers that are found in the global DNS accessible over Internet 507. Nameservers 503-505 are three of many nameservers included in the global DNS. Specifically, nameservers 503-505 are those of the global DNS nameservers that are relevant to the domain name of operational scenario 600 described below. It should be understood that other nameservers may be involved in scenarios for different domain names. In fact, since two or more SLD nameservers are typically used for any given domain name, it is possible that a nameserver other than SLD nameserver 505 may be used instead for the same domain name from operational scenario 600. Sub-domain nameservers also exist in the global DNS hierarchy below SLD nameservers but the example below does not include a sub-domain.

Figure 6:
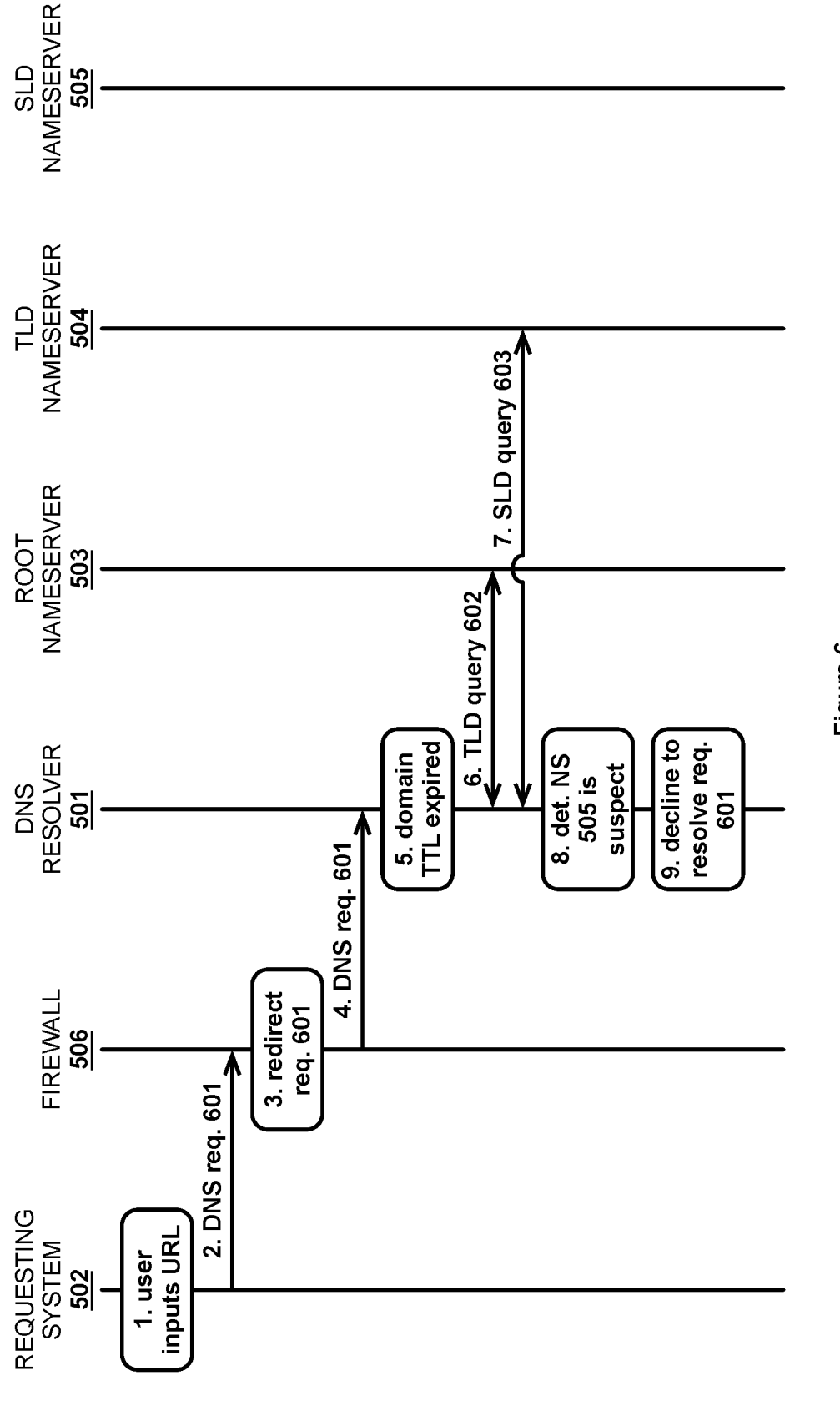
FIG. 6 illustrates an operational scenario for detecting domain hijacking during DNS lookup.

FIG. 6 illustrates operational scenario 600 for detecting domain hijacking during DNS lookup. In operational scenario 600, requesting computing system 502 is a user system, such as a laptop, desktop workstation, tablet computer, telephone, or other type of user operated device. The user of requesting computing system 502 inputs a URL for a website at step 1 into a web browser application executing on requesting computing system 502. The URL may be manually input into requesting computing system 502 using a keyboard of requesting computing system 502 (e.g., a physical keyboard or a soft keyboard displayed on a touchscreen), the user may use a selection device of requesting computing system 502 (e.g., a touchscreen, mouse, or the like) to identify a link having the URL, or the user may identify the URL to requesting computing system 502 via some other type of input.

To determine the IP address of a web server hosting the website, the web browser directs requesting computing system 502 to transfer DNS request 601 at step 2 to a DNS resolver. DNS request 601 requests that a DNS resolver determine (i.e., resolve) a network address associated with the domain name in the URL. For instance, if the URL is http://www.examplesite.com, then the domain name in the URL is "examplesite.com". DNS request 601 may be explicitly addressed to DNS resolver 501 or, as is the case in this example, DNS request 601 is direct to a different DNS resolver, such as the DNS resolver of an ISP for requesting computing system 502. Network traffic exchanged with requesting computing system 502 passes through firewall 506, which allows firewall 506 to receive the packets carrying DNS request 601 on its path to the addressed DNS resolver. Firewall 506 analyzes the packets to recognize DNS request 601 being carried in the packets and determines at step 3 that DNS request 601 should be redirected to DNS resolver 501 instead. Firewall 506 may be configured to redirect all DNS requests to DNS resolver 501 or may use rules/criteria to determine whether certain DNS requests should be redirected. For instance, a rule may direct firewall 506 to only redirect DNS requests from certain systems within the LAN protected by firewall 506.

Since firewall 506 determined that DNS request 601 should be redirected, firewall 506 transfers DNS request 601 to DNS resolver 501 at step 4 for servicing. Upon receiving DNS request 601, DNS resolver 501 determines whether an IP address for the domain name therein is cached and, if so, whether a time-to-live (TTL) associated with the domain has elapsed. Caching IP addresses for domain names allows DNS resolver 501 to more quickly respond to DNS requests (and use less resources) with cached addresses rather than having to reach out to nameservers in the global DNS for the IP addresses, especially when DNS resolver 501 is handling DNS requests from many different requesting computing systems. Since the IP addresses associated with domain names can change, a TTL is associated with the IP addresses for each domain to minimize the chance that an incorrect IP address for a web server is provided from the cache in response to a DNS request. In this example, the TTL for domain names having nameserver criteria used by DNS resolver 501 is set to a value representing a very short amount of time (e.g. less than 10 minutes rather than a more typical 12-24 hours). The value may even be set to zero so that DNS resolver 501 never provides an IP address from the cache. The short TTL ensures that DNS resolver 501 is more frequently determining whether a domain name has been hijacked based on a nameserver(s) providing an IP address (es) for the domain name. The nameserver criteria used by DNS resolver 501 to identify whether a domain's nameservers are suspect changes over time. As such, a nameserver that previously provided an IP address for a domain name may later be determined to be suspect by DNS resolver 501. It would not be desirable for DNS resolver 501 to simply provide that IP address out of a cache due to the IP address having been provided by a nameserver that has since been determined to be suspect.

In this example, DNS resolver 501 determines that the TTL for the domain name in DNS request 601 has expired at step 5 and determines to obtain an IP address associated with the domain name from the global DNS. To obtain an IP address from the global DNS, DNS resolver 501 performs TLD query 602 with root nameserver 503 at step 6 to identify a TLD nameserver for TLD of the domain name (e.g., .com, .net, .org, .uk, .au, etc.). There are relatively few root nameservers and root nameservers are assigned network addresses that do not change, or at least change very rarely, which allows DNS resolver 501 to store and use those addresses when resolving a domain name. During TLD query 602 DNS resolver 501 requests a TLD nameserver for the domain name in DNS request 601 (e.g., a TLD nameserver for .com in the domain name "examplesite.com") and root nameserver 503 provides the information (e.g., name and IP address) for TLD nameserver 504 in response. DNS resolver 501 then uses the information provided by root nameserver 503 to contact TLD nameserver 504 and perform SLD query 603 with TLD nameserver 504 at step 7 to identify a SLD nameserver for the domain name. During SLD query 603, DNS resolver 501 requests a SLD nameserver for the domain name in DNS request 601 (e.g., the "examplesite" portion of the domain name "examplesite-.com") and TLD nameserver 504 provides the information for SLD nameserver 505 in response.

Upon receiving the information for SLD nameserver 505, DNS resolver 501 determines that SLD nameserver 505 is suspect using nameserver criteria for the domain name in DNS request 601. That is, the nameserver criteria indicates to DNS resolver 501 that the characteristics of SLD nameserver 505 do not conform to what is expected of a SLD nameserver for the domain name. In response to DNS resolver 501 determining that SLD nameserver 505 is suspect, DNS resolver 501 declines to resolve DNS request 601 using SLD nameserver 505. Though not shown, DNS resolver 501 may transfer a response to DNS request 601 back to requesting computing system 502 indicating that an IP address for the domain name could not be resolved and may also indicate the reason for not resolving DNS request 601 (i.e., that SLD nameserver 505 is suspect). In other examples, DNS resolver 501 may query TLD nameserver 504 again to check for a different SLD nameserver and then determine whether that other SLD nameserver is suspect based on the nameserver criteria. If the other SLD nameserver is not determined to be suspect, then DNS resolver 501 reaches out to the other nameserver for an IP address of the web server for the domain name and resolves DNS request 601 with that IP address.

While not resolving DNS request 601 prevents requesting computing system 502 from contacting a potentially malicious web server supplied by a suspect nameserver, DNS resolver 501 may go further to protect requesting computing system 502 or any other system protected by firewall 506. For instance, DNS resolver 501 may still contact SLD nameserver 505 for an IP address but, instead of resolving DNS request 601 with the IP address, creates a rule in firewall 506 to block network traffic exchanged with the IP address. DNS resolver 501 may also blacklist SLD nameserver 505 so that anytime SLD nameserver 505 is identified while resolving a DNS request, the DNS request is not resolved regardless of what the nameserver criteria indicates. In one example, the nameserver criteria may indicate a confidence level that a nameserver is suspect (e.g., the nameserver has a threshold number of characteristics indicating that the nameserver is suspect). Nameservers that reach a threshold level of confidence for being suspect may be placed on the blacklist.

Figure 7:
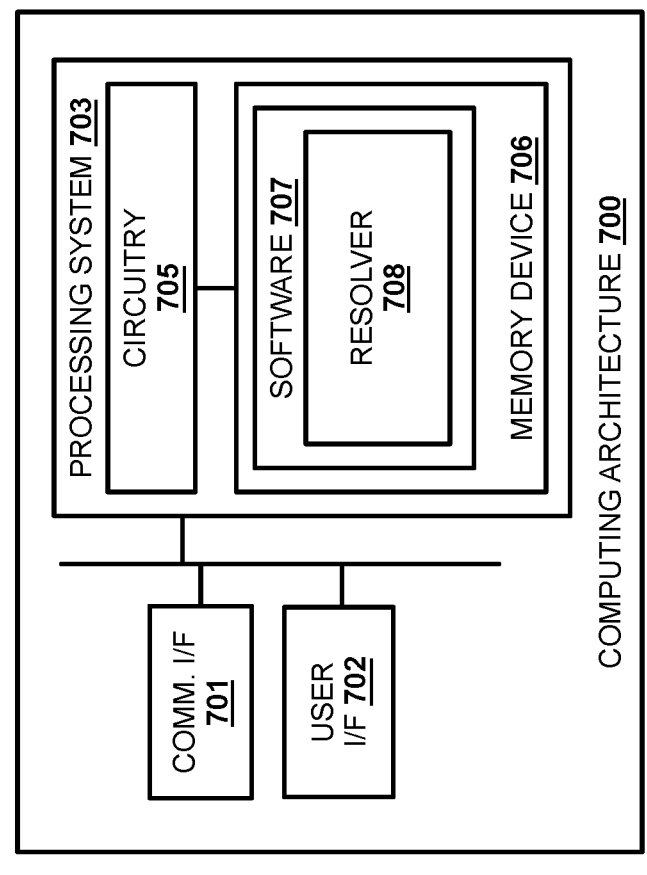
FIG. 7 illustrates a computing architecture for detecting domain hijacking during DNS lookup.

FIG. 7 illustrates computing architecture 700 for participating in a communication session using prerecorded messages. Computing architecture 700 is an example computing architecture for DNS resolvers 101, 301, 401, and 501, although those resolvers may use alternative configurations. A similar architecture may also be used for other systems described herein (e.g., requesting systems, nameservers, etc.), although alternative configurations may also be used. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/ output apparatus. User interface 702 may be omitted in some examples.

Processing circuitry 705 comprises microprocessor and other circuitry that retrieves and executes operating software 707 from memory device 706. Memory device 706 comprises a computer readable storage medium, such as a disk drive, flash drive, data storage circuitry, or some other memory apparatus. In no examples would a storage medium of memory device 706 be considered a propagated signal. Operating software 707 comprises computer programs, firmware, or some other form of machine-readable processing instructions. Operating software 707 includes resolver module 708. Operating software 707 may further include an operating system, utilities, drivers, network interfaces, applications, or some other type of software. When executed by processing circuitry 705, operating software 707 directs processing system 703 to operate computing architecture 700 as described herein.

In particular, resolver module 708 directs processing system 703 to, in response to a request to resolve a network address corresponding to a domain name, determine that a nameserver for the domain name is suspect based on satisfaction of nameserver criteria associated with the domain name. Resolver module 708 also directs processing system 703 to prevent the nameserver from resolving the request in response to determining that the nameserver is suspect.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for operating a Domain Name System (DNS) resolver, comprising:
    in the DNS resolver:
        receiving a DNS request from a requesting computing system, wherein the DNS request includes a domain name for which the requesting computing system is requesting resolution of a network address associated with the domain name in the DNS;
        in response to receiving the DNS request:
            identifying a nameserver, via a root nameserver of the DNS, the DNS resolver should contact to handle the DNS request;
            before contacting the nameserver, determining the nameserver is not a proper nameserver for the domain name specifically, wherein the proper nameserver is defined by nameserver criteria generated specifically for the domain name; and
            preventing the nameserver from being used to resolve the DNS request in response to determining that the nameserver is not a proper nameserver for the domain name.

2. The method of claim 1, further comprising:
    before the DNS request, determining characteristics of nameservers properly associated with the domain name; and
    generating the nameserver criteria based on the characteristics.

3. The method of claim 2, wherein the characteristics include geographic locations of the nameservers.

4. The method of claim 2, wherein the characteristics include a host associated with the nameservers.

5. The method of claim 2, wherein determining the characteristics comprises:
    performing a WHOIS lookup for the nameservers.

6. The method of claim 2, further comprising:
    after determining that the nameservers are properly associated with the domain name, generating a hash of the nameservers;
    after generating the hash, identifying current nameservers for the domain name and generating a second hash of the current nameservers; and

upon determining that the hash does not match the second hash, determining whether one or more of the current nameservers are suspect based on satisfaction of the nameserver criteria.

7. The method of claim 1, comprising:
    receiving a second DNS request, wherein the second DNS request includes a different domain name from the domain name, wherein the second DNS request requests resolution of a second network address associated with a different domain name in the DNS;
    in response to receiving the second DNS request:
        identifying the nameserver, via the root nameserver of the DNS, to handle the second DNS request;
        determining the nameserver is a proper nameserver for the different domain name specifically, wherein the different proper nameserver is defined by different nameserver criteria generated specifically for the different domain name; and
        allowing the nameserver to resolve the second DNS request in response to determining that the nameserver is a proper nameserver for the domain name while preventing the nameserver from resolving the DNS request.

8. The method of claim 1, further comprising:
    before the DNS request, determining other characteristics of other nameservers properly associated with other domain names; and
    generating the nameserver criteria based on the other characteristics.

9. The method of claim 1, wherein a whitelist of domain names includes the domain name and wherein each domain name in the whitelist has corresponding nameserver criteria.

10. The method of claim 9, further comprising:
    setting a lookup cache time-to-live for the whitelist of domain names to a predetermined value that is lower than a time-to-live value for other domain names.

11. An apparatus for a Domain Name System (DNS) resolver, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
        receive a DNS request from a requesting computing system, wherein the DNS request includes a domain name for which the requesting computing system is requesting resolution of a network address associated with the domain name in the DNS;
        in response to receiving the DNS request:
            identify a nameserver, via a root nameserver of the DNS, the DNS resolver should contact to handle the DNS request;
            before contacting the nameserver, determine the nameserver is not a proper nameserver for the domain name specifically, wherein the proper nameserver is defined by nameserver criteria generated specifically for the domain name; and
            prevent the nameserver from being used to resolve the DNS request in response to determining that the nameserver is not a proper nameserver for the domain name.

12. The apparatus of claim 11, wherein the program instructions further direct the processing system to:
    before the DNS request, determine characteristics of nameservers properly associated with the domain name; and generate the nameserver criteria based on the characteristics.

13. The apparatus of claim 12, wherein the characteristics include geographic locations of the nameservers.

14. The apparatus of claim 12, wherein the characteristics include a host associated with the nameservers.

15. The apparatus of claim 12, wherein to determine the characteristics, the program instructions direct the processing system to:

perform a WHOIS lookup for the nameservers.

16. The apparatus of claim 12, wherein the program instructions further direct the processing system to:

after the nameservers are determined to be properly associated with the domain name, generate a hash of the nameservers;

after the hash is generated, identify current nameservers for the domain name and generate a second hash of the current nameservers; and upon a determination that the hash does not match the second hash, determine whether one or more of the current nameservers are suspect based on satisfaction of the nameserver criteria.

17. The apparatus of claim 16, wherein the program instructions further direct the processing system to:

receive a second DNS request, wherein the second DNS request includes a different domain name from the domain name, wherein the second DNS request requests resolution of a second network address associated with a different domain name in the DNS;

in response to receiving the second DNS request:

identify the nameserver, via the root nameserver of the DNS, to handle the second DNS request;

determine the nameserver is a proper nameserver for the different domain name specifically, wherein the different proper nameserver is defined by different nameserver criteria generated specifically for the different domain name; and allow the nameserver to resolve the second DNS request in response to determining that the nameserver is a proper nameserver for the domain name while preventing the nameserver from resolving the DNS request.

18. The apparatus of claim 11, wherein the program instructions further direct the processing system to:

before the DNS request, determine other characteristics of other nameservers properly associated with other domain names; and generate the nameserver criteria based on the other characteristics.

19. The apparatus of claim 11, wherein a whitelist of domain names includes the domain name and wherein each domain name in the whitelist has corresponding nameserver criteria.

20. One or more non-transitory computer readable storage media having program instructions stored thereon for a Domain Name System (DNS) resolver, the program instructions, when read and executed by a processing system, direct the processing system to:

receive a DNS request from a requesting computing system, wherein the DNS request includes a domain name for which the requesting computing system is requesting resolution of a network address associated with the domain name in the DNS;

in response to receiving the DNS request:

identify a nameserver, via a root nameserver of the DNS, the DNS resolver should contact to handle the DNS request;

before contacting the nameserver, determine the nameserver is not a proper nameserver for the domain name specifically, wherein the proper nameserver is defined by nameserver criteria generated specifically for the domain name; and prevent the nameserver from being used to resolve the DNS request in response to determining that the nameserver is not a proper nameserver for the domain name.

* * * * *